July 4, 1967    J. R. COLE ETAL    3,329,930
MARINE VIBRATION TRANSDUCER

Filed May 20, 1965    2 Sheets-Sheet 1

INVENTORS
JIMMY R. COLE &
FRANK CLYNCH
BY William J. Miller
ATTORNEY

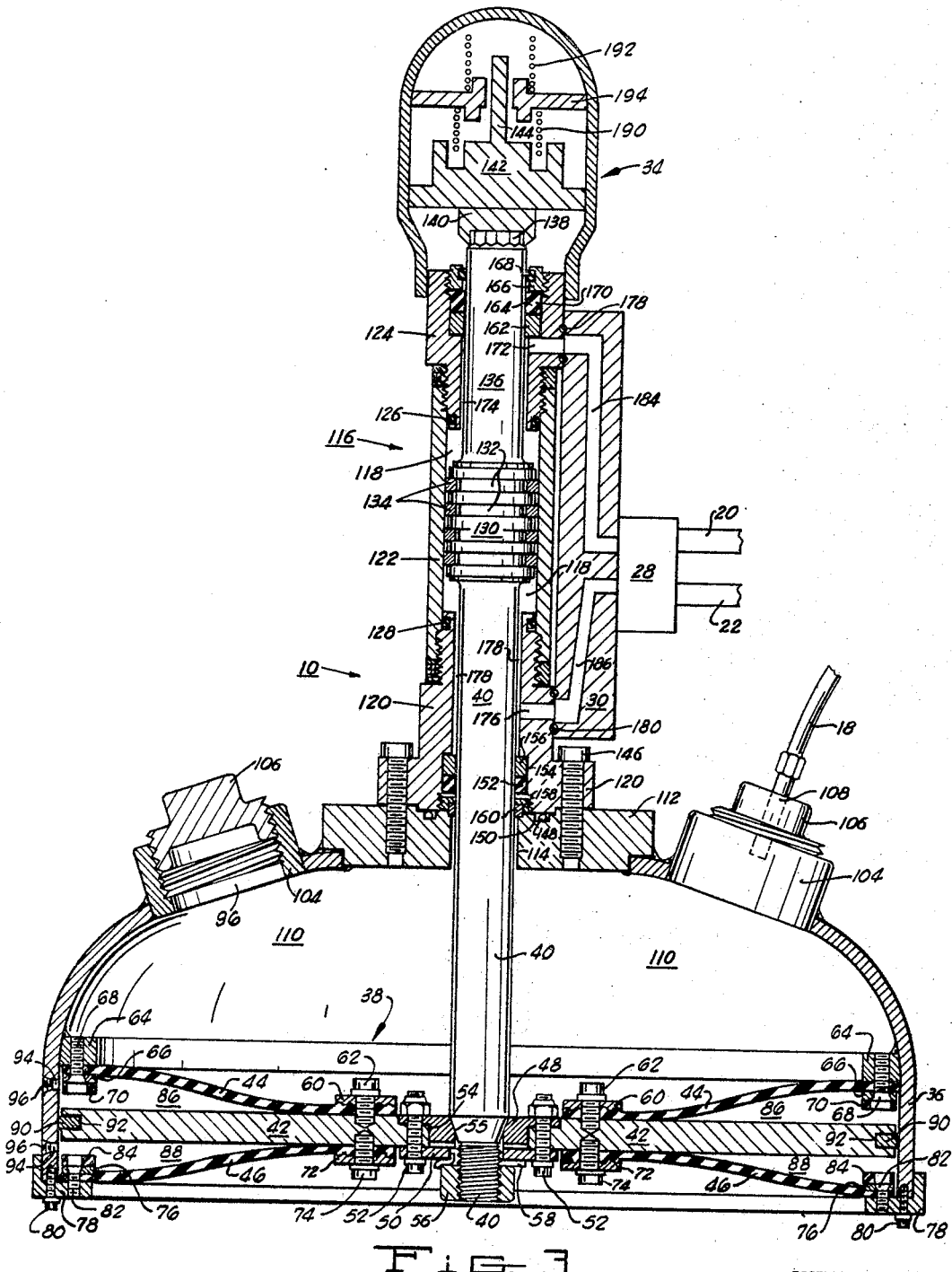

United States Patent Office 3,329,930
Patented July 4, 1967

3,329,930
MARINE VIBRATION TRANSDUCER
Jimmy R. Cole and Frank Clynch, Ponca City, Okla.,
assignors to Continental Oil Company, Ponca City,
Okla., a corporation of Delaware
Filed May 20, 1965, Ser. No. 457,285
9 Claims. (Cl. 340—17)

This invention relates to improvements in the art of marine seismic prospecting, and more particularly, but not by way of limitation, it relates to an improved apparatus for generating acoustic energy vibrations in a water body.

There has been increasing activity in the field of geophysical prospecting over water-covered areas. This is generally performed with single impulse types of sources, such as dynamite shots, gas guns, electric arc sources, pneumatic guns, and so forth. In order to better take advantage of certain of the correlation and other improved signal processing techniques, it would be desirable to be able to impart an acoustic energy input to the water layer which has a unique, non-repetitive frequency content over a predetermined period of time. In certain water-covered areas, as dictated by various conditions of the water, such as the depth, bottom structure, and bottom material, it is advantageous to employ a vibrational or controlled seismic energy signal in a sounding operation in order to enable greater processing control and ease of interpretation of the acquired data.

The present invention contemplates a water transducer that can be operated to produce acoustic energy input to the water such that a seismic signal of precisely controllable characteristics and duration is imparted to the sub-terrain. In a more limited aspect, the present invention provides a vibrational transducer which is driven at a controlled rate to impart the vibrations by driving a piston vertically, reciprocally against the water medium. The vibrator is housed for immersion in the water, with the lower end or bottom of the reciprocating piston imparting the vibrations to the water and the inner housing areas being isolated and maintained at a predetermined air pressure.

It is an object of the present invention to provide a vibrational transducer for imparting acoustic energy in a water body.

It is another object of the invention to provide a vibrator for producing acoustic energy of precisely controllable frequency and duration in a water body.

It is a further object of the present invention to provide a vibrator device which is light in weight and easily transported and operated over a water-covered area.

It is still another object of the invention to provide a hydraulically driven acoustic energy vibrator which can be completely supported and driven from a small craft.

It is also an object of this invention to provide a vibrator which exhibits a substantial degree of coupling to the water body for any of a comparatively wide band of vibration frequencies.

It is yet another object of the present invention to provide a piston-type vibrational transducer wherein the portion of the piston subject to wear is immersed in lubricating oil and isolated from contact with the water.

Finally, it is an object of the present invention to provide a hydraulically driven, piston-type vibrator wherein the piston member is isolated from the water body and continually lubricated, and the internal housing of the vibrator assembly is maintained at an air pressure substantially equal to the surrounding water pressure.

Other objects and advantages of the invention will be evident from the following detailed description when read in conjunction with the accompanying drawings which illustrate the invention.

In the drawings:

FIG. 3 is an enlarged vertical cross-sectional view of the entire vibrator assembly.

Figure 1:
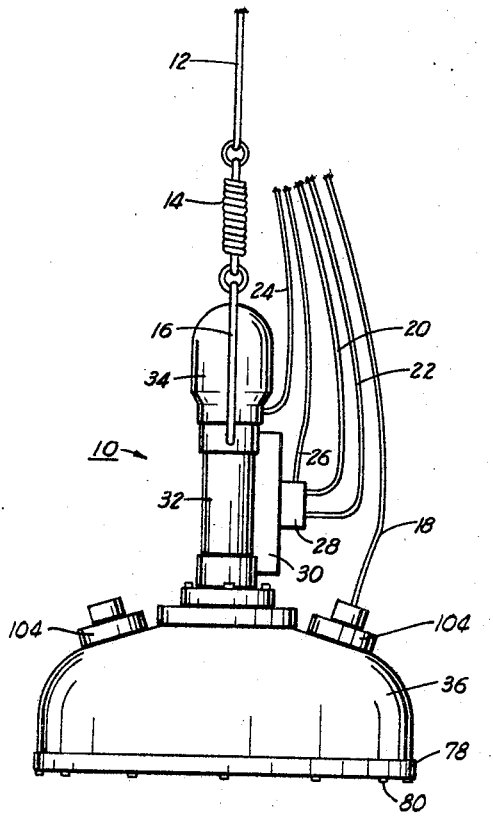
FIG. 1 is a side view of the vibrator assembly as it would appear supported for operation.
Figure 2:
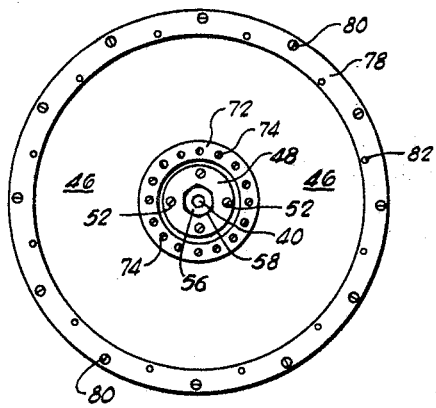
FIG. 2 is a bottom view of the vibrator.

Referring now to FIG. 1 for the detailed description, the vibrator 10 is shown as it would be suspended from a suitable dock-side of floating station for vibrational usage. In some operations, it has been found that the hydraulic and electrical control equipment can be truck-mounted for enabling dock-side use of the vibrator 10, or, in some cases, a plurality of vibrators 10. However, it is contemplated that for the most versatile usage the hydraulic and electrical control equipment would be mounted on a suitable small craft which would also include the hoisting and support equipment for handling the vibrator 10.

The vibrator 10 is supported from a cable 12 and an isolation spring 14 by means of a suitable supporting bracket, shown generally at 16, which could be mounted in any number of configurations about the body portions of the vibrator 10. The isolation spring 14 is selected to be of a size and having spring characteristics as selected from considerations of the weight of the vibrator 10 and the frequency range of operation. Thus, the isolation spring 14 is selected to provide maximum damping of any motion which may be transmitted from the vibrator 10 to the cable 12 within that range of frequencies wherein vibratory output is generally produced. For most seismic prospecting applications, the frequency range extends from about 10 cycles per second up to about 150 cycles per second.

Air pressure can be regulated from the operating station or craft through a line 18. Hose lines 20 and 22 are the hydraulic input and exhaust lines, also supplied from the operating station and controlled by conventional hydraulic equipment. A pair of electrical conduits or water-proof lines 24 and 26 are extended down from the surface control equipment. The line 26 provides control signals to a servo valve 28 which controls the fluid flow in a manifold 30 supplying the hydraulic pressure alternations to a hydraulic cylinder 32. The control line 24 provides electrical control indications from an assembly 34 which provides electromagnetic sensing elements for deriving control indications as will be described.

The vibrator 10 also includes a bell-shaped housing 36 for the purpose of enclosing a piston assembly 38 and piston rod 40 as shown in FIGURE 3. The piston assembly 38 comprises a piston member 42 and upper and lower rubber diaphragms 44 and 46.

The piston 42 is preferably formed of aluminum to minimize the total weight of the piston assembly and is secured on the shaft 40 by means of upper and lower annular-shaped clamping plates 48 and 50 interconnected by suitable threaded fasteners 52. The upper plate 48 is preferably formed of flame-hardened steel and extends downwardly into a bore 54 formed in the central portion of the piston 42 to make engagement with the shaft 40. A taper 55 is formed around the inner periphery of the upper clamping plate 48 and is shaped to mate with a corresponding taper on the outer surface of the shaft 40. It will thus be seen that when the clamping plate 48 is wedged onto the tapered portion of the shaft 40 by a nut 56 threaded onto the lower end of the shaft, the piston 42 will be rigidly secured on the shaft. It is also desirable to provide a lock washer 58 between the nut 56 and the lower clamping plate 50 to further assure that the piston 42 will be maintained in position on the shaft 40.

The upper rubber diaphragm 44 is annular in shape and is sealingly secured between the upper surface of the piston 42 and the housing 36. The inner peripheral portion of the diaphragm 44 is sealed and secured to the piston 42 by means of a clamping ring 60 and a plurality of circumferentially spaced screws 62. The outer peripheral portion of the diaphragm 44 is sealed and secured to the housing 36 by means of upper and lower clamping rings 64 and 66 and a plurality of screws 68. The clamping ring 64 is preferably welded to the inner periphery of the housing 36 to provide a rigid support for the outer periphery of the upper diaphragm 44. Also, a plurality of rubber bumpers 70 are preferably bonded to the lower clamping ring 66 to be engaged by the piston 42 in the event of over travel of the piston.

The lower rubber diaphragm 46 is also annular in shape and is secured between the lower face of the piston 42 and the housing 36. The inner peripheral portion of the diaphragm 46 is secured to the piston 42 by means of a clamping ring 72 and a plurality of circumferentially spaced screws 74 to provide a fluid-tight connection of the diaphragm to the piston. The outer peripheral portion of the diaphragm 46 is sealed and secured to the housing 36 by means of upper and lower clamping rings 76 and 78. The lower clamping ring 78 is rigidly secured to the lower edge of the housing 36 by means of a plurality of screws 80, and the upper and lower clamping rings 76 and 78 are clamped against the diaphragm 46 by means of a plurality of screws 82. Also, a plurality of rubber bumpers 84 are preferably secured to the upper clamping ring 76 to be engaged by the piston 42 in the event of over travel of the piston.

It will thus be seen that the diaphragms 44 and 46 provide upper and lower chambers 86 and 88 above and below the piston 42. These chambers are provided to receive lubricating oil and are maintained separated by a suitable sealing ring 90 sealingly engaging the inner surface of the housing 36 and secured in a mating groove 92 around the outer periphery of the piston 42. Lubricating oil is supplied to the chambers 86 and 88 by means of upper and lower ports 94 (normally closed by plugs 96) in such a manner that the chambers 86 and 88 can be completely filled with lubricating oil and all air excluded therefrom.

Access holes 96, two of which are shown, are provided around the upper, curved portion of the bell-shaped housing 36. These are formed by welding a coupling 104 in the housing member 36 and a threaded pipe plug 106 is then inserted therein for air-tight sealing. One of the pipe plugs 106 will also be fitted with an air inlet connector 108 for connection with the air pressure line 18 in a conventional manner. This air input serves to vary the air pressure in the interior cavity 110 of the housing 36 above the piston assembly 38 to a particular operating pressure. This will depend upon the depth and mode of operation in most cases as will be further described.

A shaker housing member 112 is welded around the upper extremity of the bell-shaped housing 36 and has a circular opening 114 therethrough which receives the lower piston rod 40. The member 112 also provides a fastener and foundation for the vibrator prime mover. The prime mover may, of course, be any of the previously used types, e.g. electromagnetic, pneumatic, hydraulic; however, the particular embodiment is shown and described as having a hydraulic motor in conjunction therewith.

The hydraulic motor is of previously known design which has been employed wtih other land-type vibrator systems. This type of vibrator motor has been particular subject matter in U.S. Patent No. 3,073,659, issued on Jan. 15, 1963, to the assignee of the present invention.

In order to clarify understanding of the overall apparatus, a brief hydraulic motor description is again included herein. A hydraulic cylinder 116, defining a chamber 118, is made up of a flange head 120, a barrel portion 122, and an upper head 124. The flange head 120 and upper head 124 are each received in threaded connection within the ends of the cylinder barrel 122, and suitable sealing rings 126 and 128 are employed in conventional manner. A double rod-end piston 130, having a plurality of circumferential grooves 132 therein, is placed for reciprocal movement in the chamber 118. A plurality of piston rings are seated in the grooves 132 to afford movable, sealed contact with the inner side walls of the barrel 122. The lower piston rod 40 previously referred to extends from the piston 130 down through the flange head 120 and finally to connection with piston 42, the vibrating element. An upper rod 136 extends up through the upper head 124 wherein a keyed end connection 138 is fitted within a member 140 which serves to position a pair of magnetic coil core members 142 and 144 as will be described.

The lower flange head 120 is connected in sealed relationship to the shaker housing 112 by means of cap screws 146. A sealing ring 148, seated in a groove 150 in the shaker housing 112, serves to seal the interior of the vibrator 10 from the exterior, and a suitable compressible-type sealing medium 152 isolates and seals off the pressure chamber 118. The sealer 152, preferably a Chevron-type packing, is maintained in an annular cavity 154 between a spacer ring 156 and a circular nut 158. A wiper or quad ring sealer 160 is then maintained below the circular nut 158.

A similar type of sealing arrangement is employed between the upper rod 136 and the upper head 124 for the purpose of sealing off and isolating the pressure chamber 118. A cylindrical spacer 162, a packing 164 and a ring nut 166 enclosing a quad ring 168 are maintained within an annular chamber 170 in the upper head 124.

A fluid port 172 communicates with the pressure chamber 118 through a clearance or passage 174 between the upper head 124 and the upper rod 136. Similarly, a lower fluid port 176 communicates through a clearance 178 with the pressure chamber 118. The fluid ports 172 and 176 are then connected, as sealed by the respective O-rings 178 and 180 in conventional manner, to the manifold 30. The manifold 30 includes fluid passages 184 and 186 which are connected in conventional manner to the servo valve 28. As previously indicated, the servo valve 28 is electrically controlled from the surface position to drive the hydraulic motor. The servo valve 28 is a well-known type of four-way valve for rapidly reversing the application of fluid from the hydraulic lines 20 and 22. That is, the valve 28 would apply the high pressure hydraulic input from line 20 to the manifold conduit 184 while connecting the exhaust line 22 to the manifold conduit 186; and then on the alternate condition, the servo valve 28 would reverse the application, connecting the high pressure line 20 to the manifold conduit 186 and the exhaust line 22 to the manifold conduit 184. The servo valve 28 is controlled in response to surface equipment to regulate the frequency and duration of hydraulic motor operation.

The assembly 34 is well known and one which enjoys various similar usage in hydraulic motor control. While not specifically shown, the device provides a control output to the surface equipment which can be continually used for indicating and regulating the centering and limits of thrust of the piston 130. A pair of coils 190 and 192 are mounted above and below a suitable support member 194. A magnetic core member 142 having extension 144 is mounted in a manner such that partial coupling is provided within each of coils 190 and 192. Thus, reciprocation of cylinder 130 and, therefore, of the magnetic core members 142 and 144 will induce voltages in coils 190 and 192 which represent the velocity between rod 40 and cylinder 122. These velocity signals are then employed as control signals to continually correct the positioning of servo valve 28. There are other electrical devices which are suitable for the application; such as a displacement-type device known as the LVDT, linearly variable differential transformer, which is commercially available from the Sanborn Company of Waltham, Massachusetts.

*Operation*

The marine vibrator 10 would be supported and hauled by a suitable truck (as in the case of dock-side use) or a boat for use in the seismic prospecting operation. In this present operational explanation, we will assume that the vibrator 10 is carried and controlled by a shooting boat (not shown) which also carries the necessary hydraulic and electronic control equipment. The reception and recording of the seismic signals as detected by a suitable geophone array may be carried out either by a separate recording boat, or the signal processing and recording equipment could be located on the shooting boat itself.

The vibrator 10 is readied for vibrational operation on board the shooting boat. The access pipe plugs 106 may be removed to enable internal inspection of the space 110, the rear or inner rubber diaphragm 44 and its various clamping devices 60, 64 and so forth. The access pipe plugs 106 would then be tightened down to provide an air-tight seal. Lubricating oil is injected through the holes 94 in the side of the bell-shaped housing 36 for the purpose of filling the chambers 86 and 88, the spaces enclosed by respective rubber diaphragms 44 and 46 above and below the piston member 42. This oil is filled through the holes 94, and each of the chambers 86 and 88 which actually hold several gallons of oil; however, only one gallon is introduced into each of chambers 86 and 88 and then any remaining air is forced out by suitable means. With all air properly displaced, the compressibility of the oil within spaces 86 and 88 is kept to a minimum.

With the chambers 86 and 88 filled, the vibrator 10 is then ready to be lowered in the water and set into operation whereby it generates a vibrational output in the water layer. The depth at which the vibrator 10 will be lowered depends upon various conditions of the water body, such as the depth of the water, the texture and reflection coefficient of the water-bottom, and the distance and spacing of the particular geophone or geophone array which is used with the system. This information can best be interpreted or derived from an initial test record. When the proper depth is determined and vibrator 10 has been lowered down, the air pressure within space 110 is adjusted by means of the air line 18 to equal the static water pressure exterior to the housing. This pressure balance keeps the lubricating oil distributed evenly on both sides of the piston 42 and assures that the full force of the hydraulic actuator can be transferred to the transmission medium or surrounding water.

The transducer for the embodiment shown is a 3000 p.s.i., hydraulically actuated piston-cylinder assembly. The high-pressure, low-flow capability of the hydraulic actuator is transformed to a low-pressure, high-flow system by means of the larger piston cylinder (housing 36 and piston 42) assembly which is attached to the actuator and driven in contact with the water. Thus, a large volume of water is displaced periodically as the large piston cylinder assembly expands and contracts. This displacements of water generates a pressure wave which travels as acoustic energy in the water. It should be understood, however, that the reactive force imposed upon the housing 36 moves the housing 36 upward when the piston 42 moves downward. Thus pressure waves originate from the exterior of housing 36 as well as the piston assembly 38.

Referring to FIG. 1, the hydraulic high pressure line 20 and the exhaust line 22 would be enabled such that electronic control of the servo valve 28 by means of cable 26 from the shooting boat would cause actuation of the hydraulic motor. The servo valve 28 would be under control of electrical signals generated in a suitable timing generator on board the shooting boat so that it would alternate the high pressure and exhaust sources between the ports 172 and 176 of the hydraulic motor 116 to cause reciprocation of the piston 130 in response thereto. This alternation would be at a controlled rate as set by the timing generator on the surface.

The lower rod 40 driven by the drive piston 130 is connected to the vibrator piston 42 to impart the reciprocal motion thereto. The vibrator piston 42 is, as previously noted, immersed in oil as contained in the chambers 86 and 88 enclosed by the respective rubber diaphragms 44 and 46. Thus, continual lubrication is maintained around the lower inner surface of housing member 36 and the piston ring 90. This arrangement also enables greater output from the transducer at low frequencies since it is necessary to have rather large piston displacements between the piston 42 and the cylinder or housing 36. Hence, sealing by means of the rubber diaphragms 44 and 46 keeps water out of the transducer to thus allow free motion of the system.

The assembly 34 serves to provide a continual control signal to the surface equipment so that the centering and thrust of the cylinder 130 are maintained within proper, preset limits. It may also be desirable to employ the linearly variable differential transformer for this function. The LVDT generally comprises a cylindrically wound transformer having an A.-C. reference voltage applied to the primary and a control voltage is taken from series opposed secondary windings, each having their inductance coupling varied in response to hydraulic motor position. It should be understood, however, that various commercially available devices may be used to exercise this servo control function.

In the usual operation, the hydraulic motor 116 is controlled by the servo valve 28 so that it sweeps either an upsweep or a downsweep in frequency in the range from 10 to 150 cycles per second. Thus, the vibrational output into the water comprises an acoustic energy output which is unique and non-repetitive as to frequency.

It should be understood that other types of prime movers, such as the electromagnetic type, are compatible for use with the particular water vibrator and it is contemplated that in some areas, and for particular uses, this may be desirable. The individual elements or components of the vibrator may be formed of any of the generally used structural materials; however, the existing units are fabricated largely from steel and the vibratory piston member 42 is made of aluminum in an attempt to keep the overall weight of the unit to a minimum.

Changes may be made in the combination and arrangement of elements as heretofore set forth in this specification and shown in the drawings; it being understood, that changes may be made in the embodiments discovered without departing from the spirit and scope of the invention as defined in the following claims.

What is claimed is:

1. A vibrational transducer for generating acoustic waves in a body of water, comprising:
   a housing member having an upper and lower circular opening;
   a piston assembly having an upper and lower surface disposed to fit in moveable, sealed position within said lower circular housing opening;
   a piston rod connected to the center of the upper surface of said piston assembly and extending through said upper circular opening in moveable, sealed relation;

a piston ring inserted between the housing and said piston assembly;

flexible sealing means surrounding the upper and lower surfaces of said piston assembly and attached between the housing wall and said upper and lower surfaces of said piston for maintaining oil on both sides of the piston assembly and piston ring and for isolating the piston assembly from the surrounding water; and drive means connected to the exterior of the upper end of said housing to impart reciprocal movement to said piston rod.

2. A vibrational transducer as set forth in claim 1 wherein said flexible sealing means comprises:

a first rubber diaphragm connected around the lower rim of said housing and at the center of said piston assembly; and a second rubber diaphragm connected around a perimeter of the inner surface of said housing and also at the center of the other side of said piston assembly.

3. A vibrational transducer as set forth in claim 1 wherein said drive means comprises:

a hydraulic cylinder having a fluid port at each end, said cylinder being connected in water-tight, sealing engagement to the upper end of said housing;

a double rod-end piston disposed within said cylinder, one rod-end extending down to form said piston rod connected to the center of said piston assembly; and means for alternating the application of fluid pressure to the hydraulic cylinder ports at a controllable repetition rate.

4. A vibrational transducer for generating acoustic waves in a body of water, comprising:

a housing member having a circular lower opening and a smaller, upper opening;

a vibrator piston positioned slidably within said lower opening;

a piston ring held by said vibrator piston to assure sealing contact within said housing member lower opening;

a piston rod connected to reciprocate said vibrator piston;

a first rubber diaphragm connected between the lower opening rim of the housing member and the central area of the vibrator piston to exclude water and retain oil around the vibrator piston;

a second rubber diaphragm connected between the inner side wall of said housing member and the central area of the vibrator piston to exclude air and retain oil around the vibrator piston;

hydraulic drive means connected to the exterior of said smaller, upper opening of said housing to impart reciprocal movement to said piston rod; and connector means for providing remote connection with the interior space of said housing member so that the air pressure can be varied.

5. A vibrational transducer for generating acoustic waves in a body of water, comprising:

a housing member having a circular lower opening and a smaller circular upper opening;

a vibrator piston positioned slidably within said lower opening;

a piston ring held by said vibrator piston to assure sealing contact within said housing member lower opening;

a piston rod connected through said housing member upper opening to said vibrator piston;

a first rubber diaphragm connected between the lower opening rim of the housing member and the central area of the vibrator piston to exclude water and define a space below the lower side of said vibrator piston;

a second rubber diaphragm connected between the inner side wall of the housing member and the central area of the vibrator piston to exclude air and define a space above the upper side of said vibrator piston;

a body of lubricating oil disposed to completely fill the space defined by the first and second diaphragms around the vibrator piston;

hydraulic drive means connected to the exterior of said upper opening of the housing to drive the piston rod in reciprocal motion;

a source of air pressure; and connector means for supplying said air pressure into the housing member above said second rubber diaphragm.

6. A vibrational transducer for generating acoustic waves in a body of water comprising:

a bell-shaped housing having a large, circular lower end and a small opening at the upper end;

an aluminum vibrator piston disposed within said lower end and having a circular inner opening;

a tapered bushing block bolted within said circular inner opening of said piston to provide a more rigid connecting member;

a piston rod extending through the upper end of said housing and into tapered engagement through said bushing block;

a draw plate and shaft nut fastened to said piston rod to affix said vibrator piston and tapered bushing block rigidly thereon;

a piston ring contained between the edge of said piston and the inner wall of said lower end of the housing to maintain a movable, sealed contact therebetween;

a rim member affixed around the lower end of said housing;

first elastic diaphragm means;

a first outer clamping ring securing said first diaphragm means to said rim member;

a first inner clamping ring securing said first diaphragm means about an inner circumference on the bottom of said vibrator piston;

a support ring member affixed about the inner, lower side wall of said housing above said vibrator piston;

second elastic diaphragm means;

a second outer clamping ring securing said second diaphragm means to said support ring;

a second inner clamping ring securing said second diaphragm means about an inner circumference on the top of said vibrator piston;

a body of lubricant to be contained in the spaces defined by said first and second diaphragm means around said vibrator piston; and hydraulic means disposed on the top of said housing and connected to impart reciprocal motion to said piston rod.

7. In a vibrational transducer for generating acoustic waves in a body of water and having a housing, a piston assembly reciprocally disposed within said housing and means for driving said piston, the improvement comprising a first flexible diaphragm connected around the lower rim of said housing and extending to the center of said piston assembly, a second flexible diaphragm connected around a perimeter of the inner surface of said housing and also extending to the center of the other side of said piston assembly, and lubricant means filling the space between the two diaphragms.

8. A device as described in claim 7 wherein said lubricant is oil.

9. In an underwater transducer, the combination of:

a housing having one end thereof open;

a piston reciprocally disposed in the housing for generating waves in the water upon reciprocation thereof in the housing and transmitting such waves through the open end of the housing;

a first flexible diaphragm sealed to the housing and the end of the piston facing the open end of the housing;

a sealing ring carried by the piston in sealing engagement with the housing around the circumference of the piston;

a body of lubricant in the housing between the piston and said diaphragm;

a second flexible diaphragm sealed to the housing and the end of the piston facing away from the open end of the housing; and a body of lubricant in the housing between the piston and said second diaphragm.

References Cited
UNITED STATES PATENTS

| | | |
|---|---|---|
| 2,587,848 | 3/1952 | Horsley et al. |
| 2,961,639 | 11/1960 | Atanasoff _____ 340—14 |
| 3,007,454 | 11/1961 | Joelson. |

BENJAMIN A. BORCHELT, *Primary Examiner.*

SAMUEL FEINBERG, *Examiner.*

P. A. SHANLEY, *Assistant Examiner.*